2,526,724

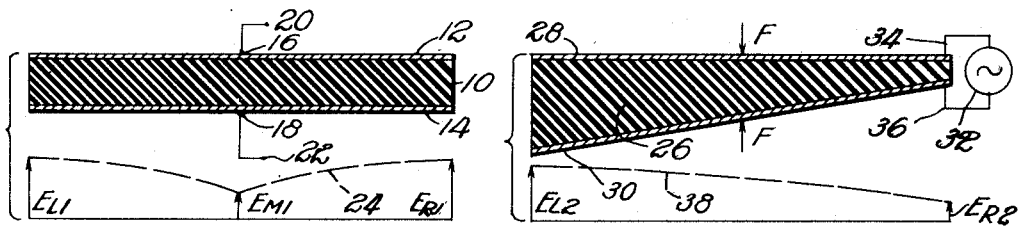
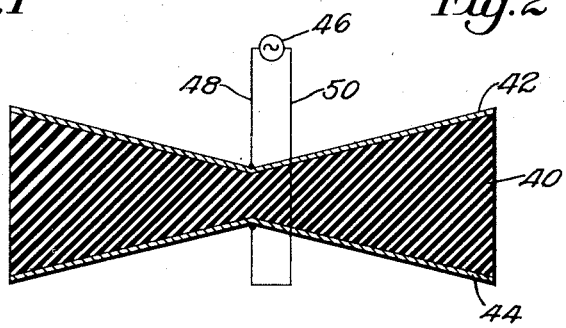
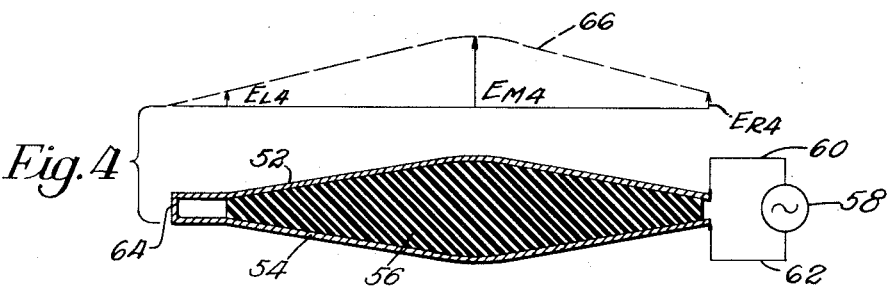
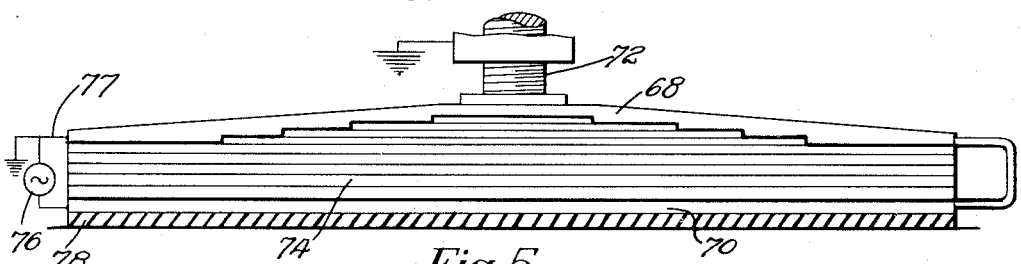
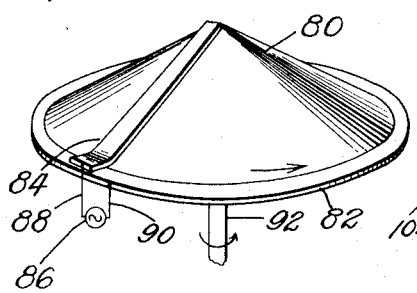
Inventor
Robert W. Bradley
By his Attorney Patented Oct. 24, 1950

UNITED STATES PATENT OFFICE 2,526,724

METHOD OF HIGH-FREQUENCY HEATING

Robert W. Bradley, Marblehead, Mass., assignor to United Shoe Machinery Corporation, Flemington, N. J., a corporation of New Jersey Application January 3, 1947, Serial No. 719,992

7 Claims. (Cl. 219—47)

This invention relates to a method of heating an object of dielectric material in a high-frequency field. More particularly, it relates to the problem of producing a uniform heating effect in an object either the thickness of which is non-uniform or the dielectric loss factor of which in a high-frequency field differs in different sections of such object.

In a broad sense the invention pertains to improvements in the now well-accepted process, utilizing the penetrating effect of a high-frequency field, of heating an object of dielectric material quickly throughout by producing heat simultaneously at all points in the object. Such a process depends for the production of heat in this manner upon the dielectric losses of the material when subjected to a field, and the process is recognized to be much more effective and rapid than processes in which the object is placed in a heated oven, for example, to become heated by the gradual conduction of heat into the inner regions of the body of the object.

Generally, in connection with carrying out the process of heating an object in a field, it has become evident that uniform heating can be effected in all parts of the object only if the product of the loss factor of the material in each part of the object and the square of the field intensity in that part is the same. The field intensity, often referred to as the voltage gradient, is commonly expressed in volts per inch. With a homogeneous object of non-uniform thickness, for example, placed between electrodes, it has been a problem to produce uniform heating in the different parts of the object since the field intensity at any point in the object depends upon the electrical path length of that portion of the field extending between the electrodes and through such point. The problem has other phases which will be self-evident from the present description.

An object of the present invention is to provide an improved method of uniformly heating an object, or the adhesive between parts of such an object, of non-uniform cross-section, and to provide such a method in which, if desired, pressure may be transmitted to the object directly by means of electrode members placed in contact with opposite sides of the object.

Accordingly, a method is provided comprising the steps of positioning electrodes along or next to the opposite sides of the object to be heated and setting up a voltage standing wave on the electrodes, the voltage variation of the standing wave corresponding substantially to the variation in the thickness or the loss factor of the object. In the case of a tapered object, the electrodes may thus be placed directly against the opposite inclined surfaces of the object, and pressure may then be applied thereto, if need be. In one aspect of the method, combinations of such electrodes and standing waves may be employed in heating objects of more complex shape having differently tapered portions, and the method is equally applicable, for example, to the uniform heating of objects comprising conical figures and other figures of revolution.

These and other objects, features and advantages of the invention will become more apparent upon consideration of the following description taken in connection with the drawings, in which:

Fig. 1 illustrates in cross section the application of electrodes carrying a standing wave to an object of uniform thickness to produce a predetermined heating pattern therein;

Fig. 2 illustrates the arrangement of electrodes in subjecting a tapered object to heat and pressure, both being shown in transverse vertical section, the arrangement producing substantially uniform heat in all portions of the object;

Fig. 3 illustrates, also in section, an arrangement for substantially uniformly heating a double-tapered object by means of electrodes which are electrically approximately one-half wavelength long;

Fig. 4 illustrates a section through an arrangement for heating a double-tapered object which is tapered in a reverse manner to the object of Fig. 3;

Fig. 5 shows, in vertical section, apparatus for bonding plies of lumber with the application of pressure and of the heat of a high-frequency field, to form a beam of non-uniform thickness;

Fig. 6 illustrates in perspective an arrangement for heating a solid object in the form of a cone, in accordance with the invention; and Fig. 7 shows a section through means for heating an object of more complex configuration with the application of two pairs of electrodes carrying voltage standing waves.

It is well known that transmission lines and wave guides will sustain voltage standing waves when excited with high-frequency alternating voltage of appropriate wavelength. Moreover, the nature of the standing wave will depend upon the electrical length of the line in terms of the excitation wavelength, upon the point along the line to which the source of high-frequency energy is connected and upon the terminal impedance of the line relative to the characteristic impedance of the line. For example, a quarter-wavelength lossless line (i. e. a transmission line having no conduction, magnetic or dielectric losses, and being of an electrical length corresponding to a quarter-wavelength of the excitation voltage on the line), when excited from an energy source connected to one end of the line and when open-circuited at the other end, will sustain a standing wave of voltage rising from a predetermined value at the source end of the line to a relatively high voltage at the open-circuited end, the rise in voltage along the line ideally following a sinusoidal pattern. Such a line is said to be resonant at the source frequency employed. Similarly, a half-wavelength line having a short-circuiting connection at one end thereof and a source of alternating voltage connected to the other end will sustain a standing wave corresponding to one-half of a sine wave variation. In this case, the voltage will be minimum at the ends of the line and will be of maximum value at or near the middle of the line. Books on the subject of transmission line theory provide the mathematical considerations in analyzing these and other possible resonant conditions of transmission lines.

The present invention effectively applies these transmission-line principles in the solution of the high-frequency heating problem previously set forth, by means of a method employing resonant electrodes in a manner which will now be described.

In Fig. 1, an object 10 to be heated, comprising a layer of dielectric material of uniform thickness, is positioned between electrodes 12 and 14 which are then supplied with high-frequency energy from a suitable high-frequency energy source (not shown). In this instance the points of supply, 16 and 18, are located at the middle of the electrodes whereby, with the application of high-frequency energy of appropriate frequency to leads 20 and 22, a voltage standing wave will appear on the electrodes, approximately of the configuration indicated by dotted line 24 which is a plot of the electrode voltage as a function of position along the electrodes. This form of standing wave, having maximum values $E_{L1}$ and $E_{R1}$ occurring at the respective ends of the electrodes and a minimum value $E_{M1}$ occurring at the middle thereof, results when the electrical length of the electrodes 12 and 14, measured with the work 10 inserted therebetween, is substantially a half-wavelength at the frequency of the applied voltage. The condition may be arrived at by adjustment of the frequency of the energy source until the desired result is achieved, as indicated by the heating effect in a sample piece of work, or by other known means of measurement. With this condition present, the end portions of the object 10 will thus become heated to a greater extent than the mid-portions with a graduation of the effect in the intermediate portions.

An arrangement such as that of Figure 1 is useful, for example, where it is desirable to heat a layer of heat-polymerizable material in such a way that the outer extremities of the layer will be more greatly polymerized than the mid-portions. Another useful application of this particular arrangement relates to the problem of heating uniformly an object which, although of constant thickness, comprises material of relatively high loss factor in the mid-portion giving away gradually to material of a relatively lower loss factor in the outer portions thereof. In connection with these applications, other forms of standing waves are possible to change the positions of the affected areas of the work. Of course, were the object 10 homogeneous and to be heated uniformly, the well-known manner of so doing would be to employ a frequency which was sufficiently low as to produce no standing waves on the electrodes 12 and 14, or to employ shorter electrodes and to perform the heating in successive sections along the length of the object. The effective electrical length of the electrodes for purposes of determining the frequency of the source required to produce a standing wave will be recognized to be determined in part by the dielectric constant of the work material between the electrodes. With a dielectric constant greater than that of air the electrodes will become effectively longer electrically than they would be in air, as is well known.

The manner of uniformly heating one form of object of non-uniform thickness, in accordance with the invention, appears illustrated in Fig. 2, where a dielectric object 26, shown in section and having a thickness tapered in the plane of the drawing, has been placed between electrodes 28 and 30 to be heated. The electrodes conveniently may comprise flat strips of metal coextensive in length with the object 26. A source 32 of high-frequency energy is shown schematically and is connected to the right ends of electrodes 28 and 30 respectively through the leads 34 and 36. In producing substantially uniform heating in different cross-sectional portions of the object 26, the frequency of the source 32 is made such that a voltage standing wave will be produced on the electrodes, of the configuration indicated by dotted line 38; that is, the electrodes will be substantially a quarter-wavelength, or somewhat less, in length when the frequency of the source 32 has been appropriately determined, as aforesaid in referring to Fig. 1. Under this condition, the voltage of the standing wave will rise gradually from a value $E_{R2}$, which is the applied voltage, at the right-hand end of the electrodes 28 and 30, to a higher value $E_{L2}$ at the left-hand end, the variation corresponding approximately to the shape of the object 26. Truer conformation of the wave shape to the shape of the object may be obtained in this case by the provision of an extension of the electrodes beyond the left-hand end of the object, accompanied by an appropriate lowering of the frequency of the source 32. The object will then be subjected to the nearly linearly varying portion of a sinusoidal standing wave. The magnitude of the applied voltage may be adjusted to suit the voltage requirements of the object 26 by any suitable adjustment of the source 32.

If, in addition to the introduction of heat, pressure is to be applied to the object 26, the electrodes 28 and 30, as in Fig. 2, may be placed directly in contact with the surfaces of the object to transmit pressure thereto when a force F is applied. This is often desirable, for example, in applications calling for the bonding together of two parts which when assembled present a composite member of a shape such as that of the object 26. Other applications of an arrangement such as that in Fig. 2 arise in the preheating of tapered plastic bodies, in the drying of tapered wooden objects, and the like.

In the arrangement of Fig. 3 a double-tapered dielectric object 40 has been positioned between electrodes 42 and 44 which are supplied with high-frequency energy from a source 46, through leads 48 and 50. The leads, for a reason which will appear, are here connected to the mid-points of the respective electrodes. The effect is much as if the two halves of the object 40 were heated separately in the manner of Fig. 2, there being effectively two individual quarter-wavelength electrode pairs extending outwardly in opposite directions from the mid-points of the electrodes 42 and 44. Accordingly, the voltage standing waves will be seen to rise from a minimum value at the middle of the electrodes to a relatively larger value at the ends thereof to produce substantially uniform heating throughout the object 40. If desired, the electrodes may be used to transmit pressure directly to the object 40 as in the foregoing case of Fig. 2. Likewise, extensions may be added to the ends of the electrodes and the frequency of source 46 lowered somewhat to place the two halves of object 40 under the effect of only the more nearly linear portion of a sinusoidal standing wave.

In heating an object which is relatively thick in the middle and tapers off toward the ends thereof, the arrangement of Fig. 4 may be employed, wherein electrodes 52 and 54, placed against the opposite sides of an object 56 of this shape, are supplied with energy from a source 58. The source 58 is connected through leads 60 and 62 to one end of each of the respective electrodes, and at the other end of the electrodes a short circuiting conductor 64 is connected. The electrodes are shaped to conform to the object 56 and the frequency of the source 58 is made such as to produce a standing wave of the shape indicated approximately by the dotted line 66, which in this instance approximates the shape of the object 56 which, in turn, will be seen to conform nearly to the shape of half a sine wave. It will be apparent then that the electrodes will be approximately one-half wavelength in length when energized at the appropriate frequency, and that a short extension of the electrodes at the short-circuited end thereof beyond the leftmost portion of the object 56 is necessary, in this case, in order to produce a voltage rising to the value $E_{L4}$ in that portion of the object. This voltage, in turn, rises to the voltage $E_{M4}$ at the middle of the object 56 then falls off in magnitude toward the end near the source 58.

One practical use of an arrangement such as that of Fig. 4 is illustrated in Fig. 5, wherein a laminated wooden beam of non-uniform cross-section is produced by bonding together a number of thin plies with the use of thermoactive adhesive between the plies. Here the electrodes 68 and 70 are of relatively rigid construction to transfer the pressure of a press-screw 72, comprising part of a suitable pressure-applying means, to all parts of the beam 74. The electrodes are energized from a source of energy 76 connected by means of leads 77 and 79 to the left ends of the electrodes. The upper electrode 68 may be grounded for convenience in mounting to the pressure-applying means. It follows that the lower electrode 70 will then be insulated from ground, as by means of a low-loss dielectric member 78. With the application of high-frequency energy of the appropriate frequency the resulting voltage standing wave, as in the case of Fig. 4, will result in the desired uniformity of heating of the adhesive between the wooden plies.

Fig. 6 illustrates an arrangement for applying the invention practically to the heating of a solid object comprising a figure of revolution, in this instance, a cone 80. For this purpose, a circular metallic turntable 82, acting as a lower electrode, is provided as a base for supporting the object 80 and for rotating the same relative to an electrode 84 positioned adjacent to the surface of the cone radially. Electrode 84 and the turntable 82 electrode are then connected to a source 86 of high-frequency energy through leads 88 and 90. In accordance with the principles set forth in connection with Fig. 2, i. e., with the voltage of a standing wave produced in the object between the electrode members 82 and 84, which increases in magnitude along the electrodes as the cone thickness increases, the section of the cone coming beneath the electrode 84 will be heated to a substantially uniform temperature throughout, and it will be seen that upon rotating the turntable 82, as by means of a shaft 92, the entire cone may be heated in this manner.

In Fig. 7 there is shown an arrangement for heating an object 94 of more complex cross-sectional shape. In this example two pairs of electrodes are employed, respectively comprising members 96, 98 and 100, 102, to effect uniform heating simultaneously in the different portions of the object. In this example, the first pair are supplied with high-frequency energy from a source 104 and the second pair, from a source 106. While, in some practical applications it may be preferable to employ a single source of energy for both pairs of electrodes, nevertheless oftentimes, as here, since the length of the individual pairs of electrodes will have been determined respectively by the different lengths of the respective portions of the object to which they apply, separate sources of energy will be preferred. This is necessary in order to be able to provide energy at different frequencies to the different electrodes, to the end that the desired standing wave pattern may be produced on each electrode pair. In providing uniform heating of the object 94 the desired standing wave pattern for each electrode pair will be determined in much the same manner as in the case of Fig. 2.

With objects of more complex shapes than that of Fig. 7, still other combinations of electrodes and energy supply arrangements may be employed. It is to be understood that the invention may be applied to objects of many different shapes, effectively by dividing each of the shapes up into separate portions which are individually adapted for the application of a separate pair of resonant electrodes capable of sustaining a standing wave pattern suited to the uniform heating of the corresponding portion of the object. Moreover, depending upon the circumstances of a specific application, each of such portions of a complex object may be heated at different times or the entire object may be heated at once, as desired. In many instances the so-called stray field electrodes may be more useful than the direct field type employed in the examples herein described, especially in the heating or drying of sheet materials of odd shapes where it is most convenient to position the electrodes apart from each other, both on one side of the work. The invention is thus not to be considered as being limited to the particular arrangements described herein but is intended to be given a scope commensurate with the appended claims.

Having thus described my invention, what I claim as new and desire to secure by Letters Patent of the United States is:

1. The method of substantially uniformly heating an object of non-uniform cross-section in a high-frequency field, comprising the steps of placing said object between electrode members and energizing said electrode members with high-frequency energy of a wavelength producing thereon a standing wave whose voltage values at spaced points along the electrode members approximately correspond with the thickness of portions of said object adjacent to such points.

2. The method of claim 1 in which said object is tapered in thickness and is positioned between the electrode members in a region having by reason of standing waves on said members a voltage-amplitude variation corresponding in shape to the tapering of the object.

3. The method of subjecting an object of non-uniform cross-section to pressure and to heat produced by a high-frequency field, comprising the steps of placing said object between electrode members, energizing said electrode members with high-frequency energy of a wavelength producing thereon standing waves whose voltage values at spaced points approximately correspond with the thickness of said object at adjacent points thereon, and applying pressure to said electrode members to be transmitted to said object.

4. The method employing a high-frequency field of substantially uniformly heating an object comprising a figure of revolution having two relatively inclined surfaces, the method comprising the steps of positioning an electrode adjacent to a radial portion of one of said surfaces, positioning a cooperative electrode adjacent to the other of said surfaces, producing relative rotation of said object about its axis of symmetry and said first electrode, and supplying high-frequency energy to said electrodes at such a frequency as to produce thereon a voltage standing wave whose voltage differs at radially spaced points along the electrodes to produce substantially uniform heating of successive radial cross-sectional portions of said object coming between said electrodes during said rotation.

5. The method of substantially uniformly heating a portion of a dielectric mass, said portion having a non-uniform cross-section comprising the steps of positioning said portion between electrodes and energizing said electrodes with high-frequency electric energy at a frequency producing on said electrodes a standing wave of voltage, the different values of said voltage along said electrodes establishing a substantially uniform field intensity throughout the portion.

6. The method of substantially uniformly heating by high-frequency electric energy an object of dielectric material having variations in thickness along a dimension thereof comprising the steps of placing electrodes in contact with opposite surfaces of said object along said dimension and energizing said electrodes with high-frequency electric energy at a frequency which produces on said electrodes a standing wave whose voltage at spaced points along the electrodes is in substantially direct relation to the thickness of said object adjacent to such points.

7. The method of substantially uniformly heating by high-frequency electric energy at least a selected portion of an object of dielectric material having variations in the ratio of its loss factor to the square of its thickness along a dimension thereof comprising the steps of placing said object between electrodes extending along said dimension and energizing said electrodes with high-frequency electric energy at a frequency which produces on said electrodes a standing wave whose voltage differs at different points along said electrodes so that the product of the loss factor of the material and the square of the field intensity in each part of the portion is substantially uniform.

ROBERT W. BRADLEY.

REFERENCES CITED

The following references are of record in the file of this patent:

UNITED STATES PATENTS

| Number | Name | Date |
|---|---|---|
| 2,263,681 | Hart | Nov. 25, 1941 |
| 2,308,043 | Bierwirth | Jan. 12, 1943 |
| 2,370,624 | Gillespie | Mar. 6, 1945 |
| 2,449,451 | Cassen | Sept. 14, 1948 |
| 2,456,611 | Baker | Dec. 21, 1948 |

FOREIGN PATENTS

| Number | Country | Date |
|---|---|---|
| 567,731 | Great Britain | Feb. 28, 1945 |

OTHER REFERENCES

Bierwirth and Hoyler, Radio Frequency Heating Applied to Wood Gluing, Proceedings of the IRE, October 1943, pages 529–537, particularly page 534.